UNITED STATES PATENT OFFICE.

JOHN WEMER, OF NEW YORK, N. Y.

IODIN SOLUTION.

1,013,913.     Specification of Letters Patent.     Patented Jan. 9, 1912.

No Drawing.     Application filed April 23, 1910. Serial No. 557,110.

REISSUED

*To all whom it may concern:*

Be it known that I, JOHN WEMER, a citizen of the United States, and a resident of the city, county, and State of New York, United States of America, have invented certain new and useful Improvements in Iodin Solutions, of which the following is a specification.

My invention relates to a novel method for producing iodin in solution in a chemically available and functionally active form, and to the combination of chemicals having free iodin therein in solution obtained by this method as a new article of manufacture, or a substance not heretofore known in the arts.

I have discovered that crystalline iodin may be dissolved in a solution of tannin and glycerin without changing its chemical characteristics or properties. According to my invention crystalline iodin is first reduced mechanically to a fine powder. One part of this powder is then placed in a solution of four parts of tannin to sixteen parts of glycerin in a closed vessel and slowly agitated. The iodin will become entirely dissolved thereby without changing or affecting its chemical properties. A perfect solution is thus obtained which is stable, has no sediments, and will not precipitate.

A syrup is made of white rock candy and pure water, preferably of such proportions that there will be seven and one half pounds of the rock candy to each gallon of the syrup. This is then mixed with iodin solution which I have already described. I have used this in the proportions of ten parts of the syrup to one part of the iodin solution. The syrup acts as a preservative of the iodin solution and as it has no ingredients or elements which attack the iodin, the latter remains free.

With many solvents the iodin does not remain in its free state but is changed into salts or other chemical compounds, or is accompanied by acids which prevent its being used in many cases where the effects of the iodin or the functions which it is capable of performing are desirable but can not be obtained safely. By my novel method this want is supplied. The solution, or the solution with its preservative syrup is free from salts, contains no free acid, and is not irritant nor injurious.

What I claim is.—

1. The herein described solution of iodin comprising glycerite of tannic acid with free iodin held in solution therein.

2. The herein described solution of iodin comprising glycerite of tannic acid with free iodin held in solution therein, and a preservative syrup of sugar and water.

3. The herein described solution containing free iodin, comprising four parts of tannin, sixteen parts of glycerin with one part of iodin.

4. The herein described solution containing free iodin, comprising four parts of tannin, sixteen parts of glycerin with one part of iodin, and a preservative syrup of sugar and water.

5. The herein described method of obtaining free iodin in solution which comprises reducing crystalline iodin to a powder, placing it in a closed vessel with glycerite of tannic acid and causing it to be moved through said liquid.

6. The herein described method of obtaining free iodin in solution which comprises reducing crystalline iodin to a powder, placing one part of said powder in a closed vessel with four parts of tannin and sixteen parts of glycerin, agitating said vessel until the powder is dissolved, and adding to this iodin solution a preservative syrup of sugar and water.

In testimony whereof I have signed my name to this specification in the presence of two subscribing witnesses.

JOHN WEMER.

Witnesses:
ELLA TUCH,
ERNEST W. MARSHALL.